United States Patent [19]

Kohata et al.

[11] 4,366,533

[45] Dec. 28, 1982

[54] PWM INVERTER DEVICE

[75] Inventors: Masakazu Kohata, Kamakura; Hideki Hayashi, Sagamihara; Ichiro Miyashita, Yamato, all of Japan

[73] Assignee: Toyo Denki Seizo Kabushiki Kaisha, Tokyo, Japan

[21] Appl. No.: 167,235

[22] Filed: Jul. 10, 1980

[30] Foreign Application Priority Data

Jul. 13, 1979 [JP] Japan ................................. 54-88164

[51] Int. Cl.³ .......................................... H02P 7/36
[52] U.S. Cl. ................................... 363/136; 318/801
[58] Field of Search ................... 318/722, 800–802; 363/135–138

[56] References Cited

U.S. PATENT DOCUMENTS 3,911,340 10/1975 Plunkett ............................... 318/802
4,099,109 7/1978 Abbondanti ..................... 318/722 X
4,158,801 6/1979 Hirata ................................... 318/801

Primary Examiner—A. D. Pellinen
Attorney, Agent, or Firm—Phillips, Moore, Lempio & Finley

[57] ABSTRACT

An inverter device operating under pulse width modulation (PWM) principle in which chopping pulse is formed by crossing points of a triangle waveform and a function waveform in order that pulse width of the inverter input current decreases towards later half of pulse train in each period of pulse repetition series.

5 Claims, 8 Drawing Figures

PWM INVERTER DEVICE

BACKGROUND OF THE INVENTION

The present invention relates to an inverter operating in a pulse width modulation (PWM) principle or to a modulation system in the PWM inverter apparatus.

In a conventional PWM inverter, the control is effected by using a so called square wave shaped voltage obtained by chopping certain dc voltage so that the waveform of the chopped current may differ at each of the PWM period and accordingly the value of the commutating current varies greatly depending on the pulse series even under a same load condition. More especially, the duration of one cycle of the inverter is prolonged in counter proportion to the output frequency of the inverter in low speed frequency range. In view of this fact, the number of triangle wave signal forming the carrier signal in this duration or the pulse mode is generally increased at lower speed and thus the peak current at current commutation is suppressed. In this case, the waveform of the input current for the inverter assumes equivalently the same envelope with the motor current formed essentially by RL circuit and increases exponentially so that the current of the pulse voltage at each termination period of the repetition pulses increases also exponentially even the aforementioned increase of the pulse mode. Due to this fact the thyrister element and the current commutating circuit elements forming the inverter device should be selected to withhold the maximum current. The frequency components contained in the inverter input current include high frequency current component of 6 times higher harmonic component of the inverter output frequency beside the abovementioned chopping frequency, since the input current flows from the feeder through a filter in a form of three-phase full-wave rectification of the motor current in general by the inverter. By this reason, at the low frequency time such as the starting time, the feeder current may not be sufficiently smoothed by lowering the filter efficiency so that the feeder current may contain ripple component. Moreover in the rail, in which the inverter input current flows, there is also flow of security signal current which is in general in the commercial frequency. Accordingly, when an electric train is driven by a PWM inverter, the frequency range of the security signal system passes the device in the low frequency range especially at the starting time since the filtering effect is decreased at such low frequency range and certain signal trouble might be caused.

SUMMARY OF THE INVENTION

The present invention is to improve the aforementioned disadvantages of the prior art devices and is to realize a modulation system being able to ease the current commutating duty of the inverter and to decrease the current of lower harmonic component so as to obtain a small and light weight device.

DESCRIPTION OF THE DRAWINGS

The invention will now be described by referring to the accompanying drawings, in which.

DESCRIPTION OF PREFERRED EMBODIMENT

The invention will now be explained by referring to the accompanied drawings. In order to help a clear understanding, the prior art device is explained at first.

Figure 1:
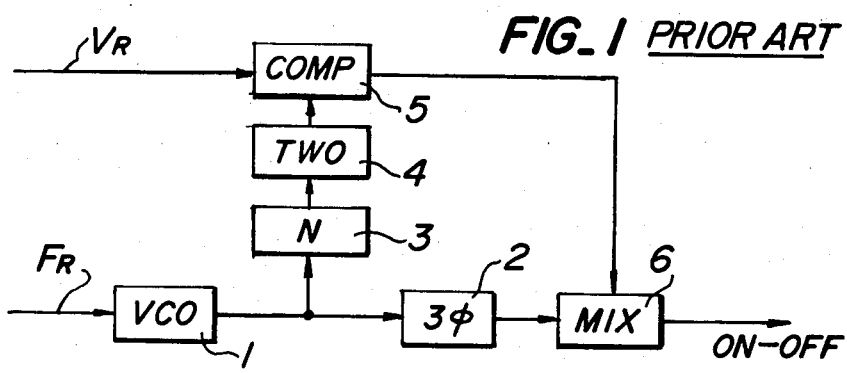
FIG. 1 is a block diagram of a typical conventional circuit arrangement of an inverter modulating device.

FIG. 1 shows a typical embodiment of a conventional modulating part of an inverter device. This conventional device is the case of a 3-phase inverter, wherein m=3, m representing the number of phases.

In FIG. 1, reference numeral 1 designates a voltage controlled oscillator being fed as the signal input a frequency instruction $F_R$ and producing a pulse series having respective frequency with said frequency instruction $F_R$, 2 is a three-phase signal distributor, 3 a multiplier, 4 a triangle wave oscillator, 5 a comparator or modulator for comparing a level signal being a voltage instruction $V_R$ of a constant voltage level and the triangle wave carrier signal, and 6 is a mixer.

The operation of the device shown in FIG. 1 will be explained by referring to FIG. 2.

Figure 2:
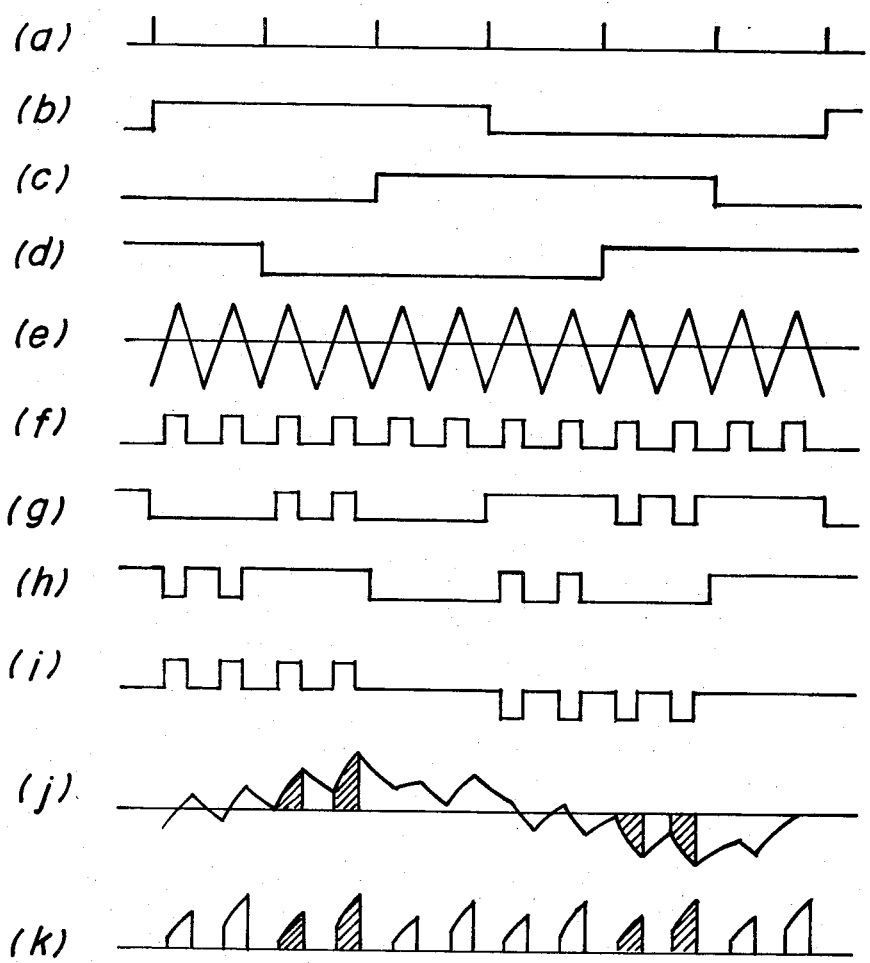
FIG. 2 is waveform diagram for various parts for explaining the operation of the device shown in FIG. 1.

The voltage controlled oscillator 1 produces a pulse series as shown in FIG. 2(a), which is synchronized with the inverter output frequency and having its repetition frequency integral multiple of the same frequency. This pulse series is fed to an input of the three-phase signal distributor 2 and is converted into three-phase signal having 120° degree phase difference between each other as shown in FIGS. 2(b), (c) and (d). On the other hand the output pulse series of the voltage controlled oscillator 1 is supplied to an input of the multiplier 3 and integral multiplied in it and a triangle wave shaped carrier signal as shown in FIG. 2(e) is produced from the triangle wave oscillator 4. In the figure, a case of multiple factor 2 is shown and this multiple factor determines the pulse mode. This carrier signal is compared with the level signal of constant voltage $V_R$ in the comparator 5 and a chopping signal as shown in FIG. 2(f) is produced. This chopping signal is mixed with the output signal of the three-phase signal distributor 2 in the mixer 6 and is altered to ON-OFF signals as shown in FIGS. 2(g) and (h) having cut off shaped in one of their 60° phase duration. In FIG. 2, only waveforms for two phases are shown. But it is apparent that three-phase waveforms having 120° phase differences each other are produced from the mixer 6. The main circuit of the inverter device is closed or opened according to the control of this ON-OFF signal and the inverter output voltage has rectangular waveform as shown in FIG. 2(i). When such an inverter output voltage is applied to an ac motor, the current waveform assumes a complicated shaped, for instance, as shown in FIG. 2(j), which shows abrupt variation at the time of ON-OFF transition. Accordingly, the inverter input current corresponds to hatched line portion in FIG. 2(j) being equal to three-phase full-wave rectification. The inverter input current has waveform as shown in FIG. 2(k), envelope of which contains 6 times frequency of the motor frequency. In the low frequency range, the use of the device is made to raise the chopping signal frequency by increasing the pulse mode.

However, since the motor frequency is generally low so that the overall filtering effect is small and there is possibility of causing inductive trouble by the low frequency component, for instance, such low frequency component current flows in the rail in a motor driven train.

The present invention is to provide a novel modulation system of the aforementioned chopping instruction signal. The invention is to decrease the current ripple in the inverter input and to suppress the current flowing through security signal system using commercial frequency so as to realize a compact device being able to effectively prevent security signal troubles.

Figure 3:
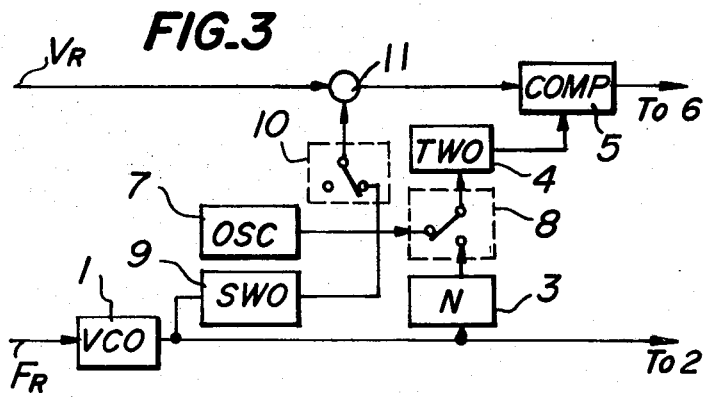
FIG. 3 is a block diagram of an inverter modulating device according to the present invention.

FIG. 3 shows simplified block diagram of an inverter especially the modulation part according to the present invention, in which 7 is an oscillator for generating a constant frequency signal, 8 and 10 are change-over switches, 9 is a sawtooth wave generator, and 11 is an adder. In the figure the same parts with that in FIG. 1 are designated by the same reference numerals.

Figure 4:
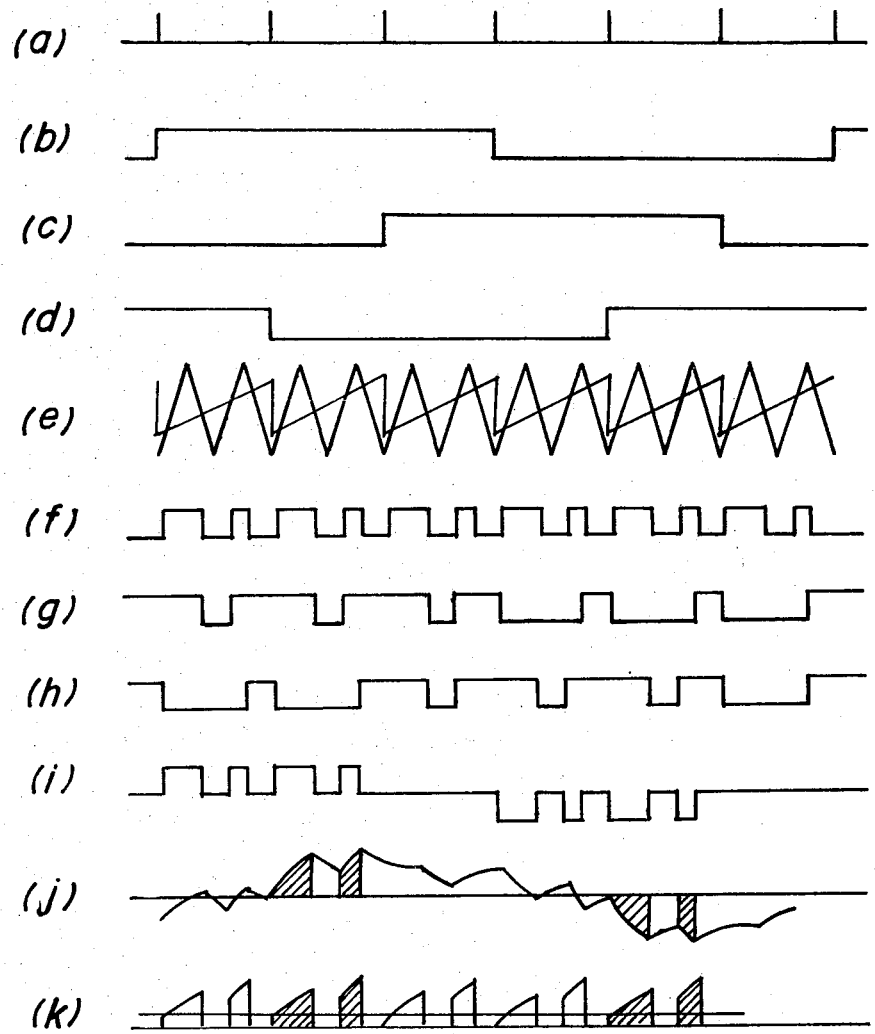
FIG. 4 is signal waveform for explaining operation of the device of FIG. 3.

The operation of the device according to the illustrated embodiment of the present invention will be explained by referring to waveform diagrams of FIG. 4. It should be understood clearly when the change over switches 8 and 10 are switched in opposite positions rather than shown in FIG. 3, the circuit assumes identical with that of FIG. 1.

In the circuit shown in FIG. 3, the voltage controlled oscillator 1 produces a pulse series as shown in FIG. 4(a) synchronized with the inverter output frequency by the frequency instruction $F_R$ and the three-phase signal having 120° phase difference between each other as shown in FIGS. 4(b), (c) and (d) through three-phase signal distributor 2 in a manner same as described with reference to FIG. 1. But in addition to above, a triangle wave oscillator 4 receives a frequency signal having a constant frequency at least 12 times of the motor frequency from an oscillator 7 and produces triangle wave shaped carrier signal synchronized therewith. Furthermore, the output of the oscillator 1 is supplied also to a sawtooth wave oscillator 9, which thus produces a sawtooth wave signal synchronized with the inverter output. This sawtooth wave signal is added with the constant voltage level signal of the voltage instruction $V_R$ in an adder 11, and compared with the carrier signal in the comparator 5 which produces the chopping signal. The formation and the waveforms of the chopping signal are shown in FIGS. 4(e) and 4(f). This chopping signal shown in FIG. 4(f) is mixed with the three-phase signals shown in FIGS. 4(b), (c) and (d) in the mixer 6 and converter into ON-OFF signals having cut portions through the whole range of 360° as shown in FIGS. 4(g) and (h). By this ON-OFF signal the main circuit of the inverter is controlled to close and to open respectively. The waveform shown in FIG. 4(i) represents inverter output voltage and it has wider pulse width at beginning half of each waveform and narrower pulse width at terminating half of the same.

When such an inverter output voltage is applied with an ac motor, a current having waveform as shown in FIG. 4(j) flows and by this current, the inverter input current becomes as shown in FIG. 4(k) which shows substantially constant average value at each period of chopping. By this pulsation waveform, the ripple can be suppressed at low frequency.

In the embodiment shown in FIG. 3, the carrier signal frequency is made as 12 times of the motor frequency for the convenience of explanation. However, in practice it is more proper to select the carrier signal frequency at a more higher one to effect so called high frequency modulation. Namely, the chopping frequency or the carrier frequency is conveniently selected in an order in a range of 0.5 to 1 KH$_Z$ (constant frequency) for obtaining the aforementioned effect and for the necessity of realizing the commutation of the current. In the above range of the chopping frequency, the low frequency component included in the input current of the inverter is decreased and the chopping frequency component becomes large so that a same effect can be obtained as if the frequency is increased at lower frequency including the time of starting. This has an effect to cover the decrease in filtering effect at low frequency. The peak value of the motor current also becomes smaller than that of the conventional case as shown in FIG. 1. Thus it becomes possible to decrease the capacity of thyristor elements and current commutating circuit capacity and the main circuit elements can be miniaturized.

If the PWM inverter device according to the present invention having the aforementioned construction is used for driving an electric train, it is preferable to use in the following embodiment in view of practical reason.

Namely in a suitable embodiment of the PWM inverter device for driving an electric train, a same modulation system with conventional one is used in the high speed range in which the inverter output frequency is high because the pulse mode is small and a filtering effect can be expected and the modulation system as shown in FIG. 3 is used in a range between the starting time and up to the input frequency of the inverter exceeding the operation frequency of the signal security device using the commercial frequency and reaching or passing a certain predetermined frequency. For this purpose, it is apparent that the change over switches 8 and 10 shown in the FIG. 3 may be switched to assume the desired modulation system.

These embodiments are to add the triangle wave shaped carrier signal with the sawtooth wave level signal among the functional waves. However, the pulse width of the inverter output voltage may have repetition waveform decreasing linearly obtained by modulating the function signal of the level signal exponentially in which a same effect may be obtained with that of the sawtooth wave.

Figure 5:
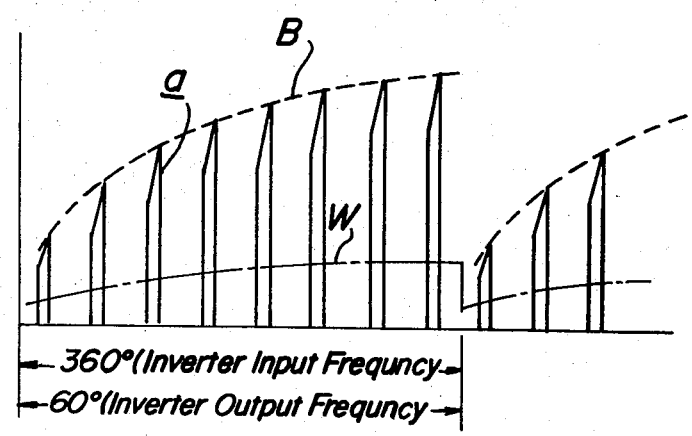
FIGS. 5 to 7 are waveform diagrams for explaining effect of the modulating part of the inverter device.
Figure 6:
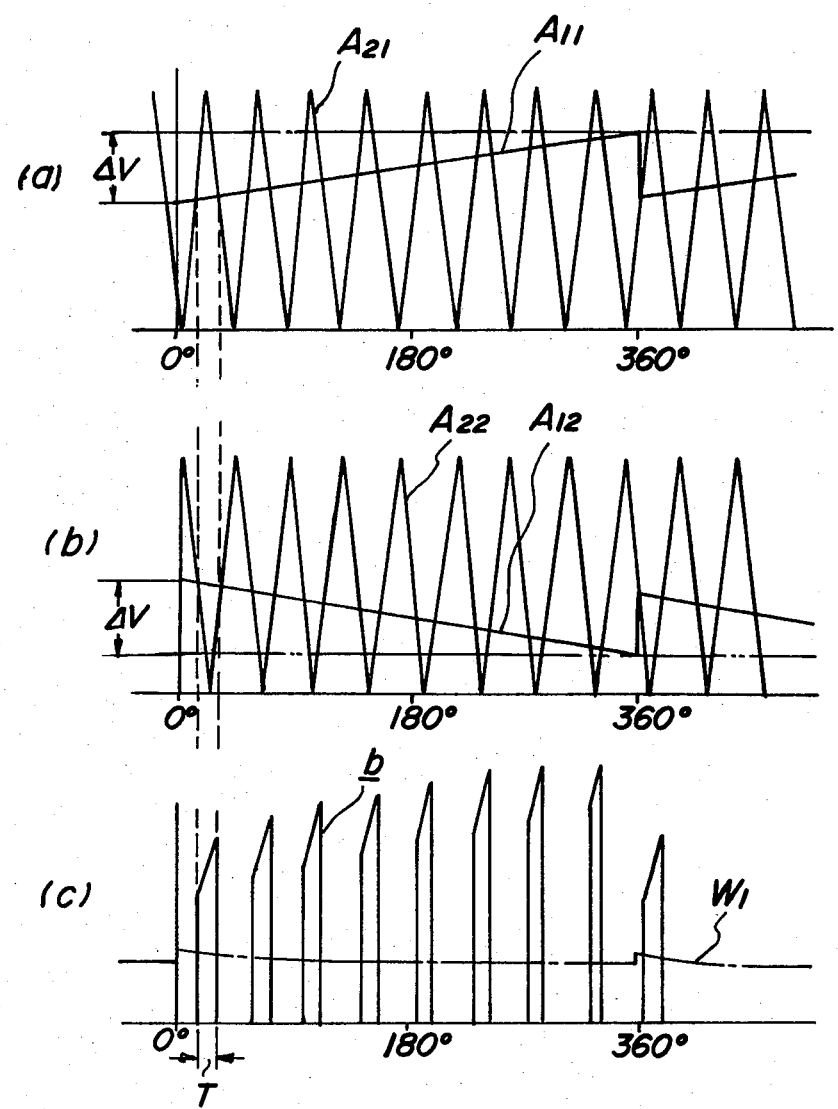
Figure 7:
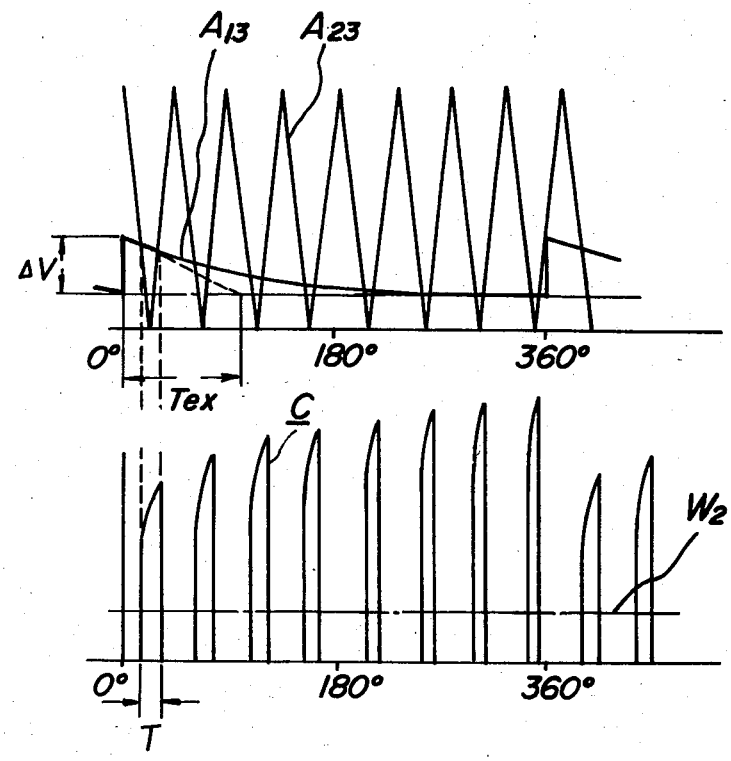

The above effects of the present invention will more fully be explained by referring to FIGS. 5 to 7. The FIGS. 5 to 7 are explanatory waveform diagrams for explaining the effect of the present invention at a higher pulse mode in which the signal trouble may have problem.

FIG. 5 shows inverter input current waveform in the conventional system as shown in FIG. 1 and in which equi-interval pulse width modulation is effected. In this prior art embodiment, an envelope B of the inverter input current waveform a varies exponentially and the average value thereof is shown by a curve W. As shown in the drawing, the average value W pulsates and commutating peak current and a current having 6 times frequency component of the inverter input frequency according to the variation of the envelope B flow the circuit.

FIGS. 6 and 7 show the inverter input current waveform when the present invention has been applied.

FIG. 6(a) shows one embodiment of formation of the input current waveform b of the inverter when the level signal $A_{11}$ is given in a sawtooth waveform. In this case, the level signal $A_{11}$ has a frequency 6 times larger than the inverter output frequency (m=3, 2m=6). The pulse width T is decided by the crossing points between the carrier signal $A_{21}$ and the level signal $A_{11}$ and the pulse width T decreases exponentially. An average value of the inverter input current waveform b for each pulse is shown by $W_1$. As can be seen from the drawing this average value $W_1$ is substantially constant. Accordingly, a current component pulsating at 6 times of the inverter output frequency can be suppressed and at the same time the commutating peak current can be suppressed by gradual decrease of the pulse width of the rear side pulses. In this case, it should be noted that some amount of the chopping frequency component remains in the waveform, but by the suppressing effect of the filter for high frequency the current in the above component can sufficiently be suppressed not to affect the feature and the source current flowing from overhead feeding wires at the input side of the filter to the earth return circuit can be made flat waveform having less higher harmonic components. The depth $\Delta V$ of the sawtooth wave as shown in the figure can also be controlled in response to the inverter output frequency. However, by adjusting the fundamental component of the inverter input current to be minimum and by keeping the depth $\Delta V$ of the level signal constant, the frequency component in problem can be removed and the aim of the present invention can be achieved.

FIG. 6(b) is a waveform of a modified embodiment which may result the same modulation effect with that shown in FIG. 6(a). In the embodiment of FIG. 6(a), at the cross points between the sawtooth waveform level signal $A_{11}$ and the carrier signal $A_{21}$ and in the range in which the level signal $A_{11}$ is lower than the carrier signal $A_{21}$ the conduction pulse width T has been decided. In the embodiment shown in FIG. 6(b), both the sawtooth wave level signal $A_{12}$ and carrier signal $A_{22}$ are reversed so that in a range in which the level signal $A_{12}$ is higher than the carrier signal $A_{22}$, the conduction pulse wave is decided exactly in the same manner as shown and explained in FIG. 6(a). In practice, it is possible to realize the abovementioned result by reversing the output signal of the triangle wave oscillator, voltage instruction $V_R$ and the sawtooth wave oscillator 9.

FIG. 7 shows a case in which the level signal $A_{13}$ is given as an exponential function having the time constant of $T_{EX}$. In this case, the envelope of the inverter input current within one cycle of the inverter input frequency varies exponentially. Whereas the modulation level signal $A_{13}$ is also given as an exponential function as can be seen from the drawing, the conducting pulse width T of the inverter input current c for each pulse within one cycle can also be varied along exponential function. Accordingly, if we choose the depth $\Delta V$ of the modulation level of the level signal $A_{13}$ and its time constant $T_{EX}$ at suitable values, the average value $W_2$ becomes constant and the current pulsation within one cycle can be eliminated so that the inverter frequency component caused by such pulsation can greatly be minimized.

Figure 8:
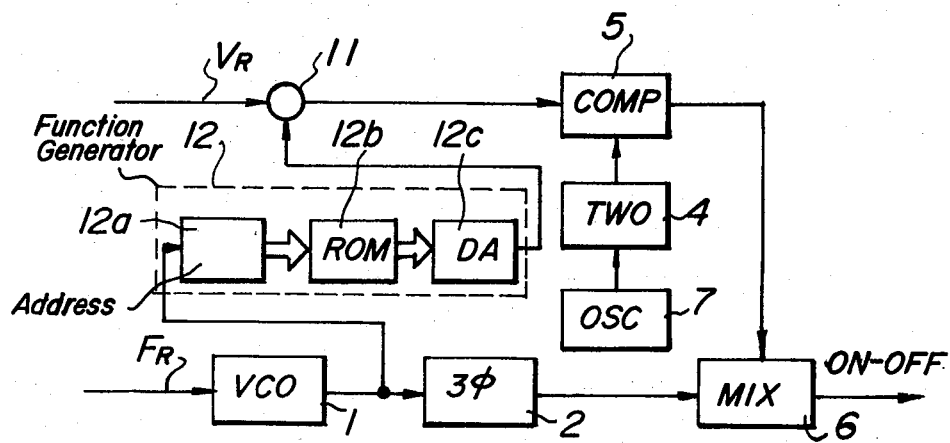
FIG. 8 is a block diagram of a modified embodiment according to the present invention.

The arrangement shown in FIG. 3 is to apply the level signal either in sawtooth waveform or exponential waveform. FIG. 8 shows an embodiment in which the exponential waveform is memorized and comprises function generating parts for deriving necessary signals therefrom.

In FIG. 8, a function generator 12 is provided, which comprises a memory element 12b being read to produce the level signal. It further comprises an address instruction part 12a for reading the memorized function wave content in the memory element 12b and for renewing the output signal successively by an input signal of the oscillator 1 synchronized with the inverter output frequency. 12c is a DA (digital-to-analog) converter for converting the digital signal read out from the memory element 12b into an analog signal. The function signal converter into analog form is added with a constant voltage level forming the voltage instruction in an adder 11. This embodiment is substantially the same with that shown in FIG. 3, except the fact that the functional waveform used as the level signal is read from the memory element 12b. By memorizing the function waveform in the memory, any desired function waveform can be generated very easily and always a correlated waveform of similar form can be obtained against a wide range of variation of the inverter output frequency.

As has been explained clearly in the foregoing, the present invention is to realize a novel modulation system in an inverter device, in which a function waveform signal having 6 times frequency higher than the motor frequency is superposed on a constant level voltage being a voltage instruction to derive triangle waveform modulated carrier signal so as to make the pulse width in the beginning half of the pulse series of the inverter output voltage waveform and that in the terminating half of the pulse series narrower thus to make the average value of the inverter input current substantially constant. The invention therefore affords a great effect to realize a small light weight device being able to materially decreasing current commutating duty and eliminating signal trouble in an electric motor car driving system.

What is claimed is:

1. A PWM inverter device for energizing ac motor with variable voltage and variable frequency output obtained from a dc current source by pulse width adjustment, characterized in that the device comprises an oscillator for generating a series of output pulses synchronized with output frequency of the inverter and having frequency integral multiple of the output frequency, a function waveform generator for generating level signal having frequency of 2m times (m being an integer representing the number of phases of the inverter device) of the inverter output frequency in response to the output of said oscillator, a triangle waveform oscillator for generating triangle wave shaped carrier signal having a constant frequency at least 12 times with that of the inverter signal, a modulator for comparing and mixing said level signal with said carrier signal, wherein said level signal is generated in a functional form in order that the pulse width of the inverter output voltage decreases monotonically and forms repeated waveforms by a chopping instruction of the modulator output.

2. A PWM inverter device as claimed in claim 1, wherein said level signal generated by said function waveform generator and synchronized with said inverter output frequency and having 2m times frequency with that of the output frequency is generated as a sawtooth waveform.

3. A PWM inverter device as claimed in claim 1, wherein said function waveform generator comprises a memory element for memorizing said function waveform and signal is generated by reading out the memorized content.

4. A PWM inverter device as claimed in claim 1, wherein said level signal generated by said function waveform generator and synchronized with said inverter output frequency and having 2m times frequency with that of the output frequency is generated as an exponential waveform.

5. A PWM inverter device for energizing ac motor with variable voltage and variable frequency output obtained from a dc current source by pulse width adjustment, characterized in that the device comprises an oscillator for generating a series of output pulses synchronized with output frequency of the inverter and having frequency integral multiple of the output frequency, a function waveform generator for generating level signal having frequency of 2m times (m being an integer representing the number of phases of said inverter device) of the inverter output frequency in response to the output of said oscillator, a triangle waveform oscillator for generating triangle wave shaped carrier signal having a constant frequency at least 12 times with that of the inverter output signal, a modulator for comparing and mixing said level signal with said carrier signal, wherein during a period from starting time to a time when the inverter input frequency passes a certain predetermined frequency said level signal is generated in a functional waveform in order that the pulse width of the inverter output voltage decreases monotonically to form repeating waveforms by the chopping instruction.

* * * * *